United States Patent [19]

Vadnais et al.

[11] Patent Number: 5,325,095

[45] Date of Patent: Jun. 28, 1994

[54] STEPPED FREQUENCY GROUND PENETRATING RADAR

[75] Inventors: Kenneth G. Vadnais, Ojai; Michael B. Bashforth, Buellton; Tricia S. Lewallen, Ventura; Sharyn R. Nammath, Santa Barbara, all of Calif.

[73] Assignee: The United States of America as represented by the United States Department of Energy, Washington, D.C.

[21] Appl. No.: 913,494

[22] Filed: Jul. 14, 1992

[51] Int. Cl.⁵ .................... G01S 13/24; G01S 13/04
[52] U.S. Cl. .................... 342/22; 342/129; 342/194
[58] Field of Search ............ 342/22, 129, 194, 196

[56] References Cited

U.S. PATENT DOCUMENTS

| | | | |
|---|---|---|---|
| 4,218,678 | 8/1980 | Fowler et al. | 343/5 FT |
| 4,381,544 | 4/1983 | Stamm | 364/420 |
| 4,435,708 | 3/1984 | Kyriakos | 343/12 A |
| 4,504,833 | 3/1985 | Fowler et al. | 343/5 NA |
| 4,507,602 | 3/1985 | Aguirre | 342/22 X |
| 4,620,192 | 10/1986 | Collins | 342/128 |
| 4,670,753 | 6/1987 | Vacanti | 342/90 |
| 4,677,438 | 6/1987 | Michiguchi et al. | 342/22 X |
| 5,192,952 | 3/1993 | Johler | 342/22 |
| 5,280,284 | 1/1994 | Johler | 342/22 |

Primary Examiner—John B. Sotomayor
Attorney, Agent, or Firm—Miguel A. Valdes; Roger S. Gaither; William R. Moser

[57] ABSTRACT

A stepped frequency ground penetrating radar system is described comprising an RF signal generating section capable of producing stepped frequency signals in spaced and equal increments of time and frequency over a preselected bandwidth which serves as a common RF signal source for both a transmit portion and a receive portion of the system. In the transmit portion of the system the signal is processed into in-phase and quadrature signals which are then amplified and then transmitted toward a target. The reflected signals from the target are then received by a receive antenna and mixed with a reference signal from the common RF signal source in a mixer whose output is then fed through a low pass filter. The DC output, after amplification and demodulation, is digitized and converted into a frequency domain signal by a Fast Fourier Transform. A plot of the frequency domain signals from all of the stepped frequencies broadcast toward and received from the target yields information concerning the range (distance) and cross section (size) of the target.

18 Claims, 9 Drawing Sheets

STEPPED FREQUENCY GROUND PENETRATING RADAR

BACKGROUND OF THE INVENTION

The invention described herein arose in the course of, or under, Contract No. DE-AC08-83NV10282 between the United States Department of Energy and EG&G Energy Measurements, Incorporated.

Many commercial ground radar systems employ baseband video pulse radar technology developed in the 1960s. This technology inherently has several disadvantages associated with it. One would expect the transmit and receive signal pulses of the radar to be of similar shape and size. Unfortunately, due to antenna characteristics, soil attenuation properties, and the location of targets in the antenna's near field, a ringing effect is produced in the radar return. This ringing phenomena can be very complex and extremely difficult to decorrelate when trying to extract relevant information from the return signal. In addition, to achieve adequate resolution, the system must use very fast pulses. This places a finite limit on the average power, which in turn reduces the signal to noise ratio of such prior art systems. Another disadvantage in some of these prior art systems is the lack of phase information which, if available, could yield an improvement in the radar return signal through the use of digital signal processing techniques.

Among the more difficult problems which have been identified in some prior art systems is the unutilized low frequency components of the video pulse signal, the lack of coherence, and the inherently low average power of such systems. In addition, the difficulty of building high dynamic range sampling hardware, the lack of a broadband, high isolation, fast transmit/receive switch, and the impossible task of building an antenna to radiate the entire signal bandwidth, indicated the need for an entirely different approach to providing a radar system for detecting anomalies in geophysical media.

The deficiencies of commercial radar systems has also been noted by others in the radar field. For example, Fowler et al. U.S. Pat. No. 4,218,678 discloses an earth penetrating radar system having a transmitter section and a receiver section. In the transmitter portion, a digital signal from a microprocessor and a base periodic signal from a master oscillator are both fed to a frequency synthesizer where the signals are multiplied to produce a base reference signal which passes through an attenuator control and an amplifier to a transmitter antenna. Stepped frequency signals making up the Fourier frequency spectrum of the desired synthetic radar pulse are transmitted. In the receiver portion, a digital signal from the microprocessor and a base periodic signal from the master oscillator are both fed to a second frequency synthesizer where the signals are also multiplied to produce a base reference signal. The second synthesizer also includes a quadrature circuit wherein the base reference signal is converted into an in-phase reference signal and a quadrature reference signal. An incoming signal passes from a receiving antenna to an RF amplifier whose output is mixed with both the in-phase and quadrature reference signals to provide both in-phase (I) and quadrature (Q) output signals. The I and Q output signals are then digitized and recorded for each frequency, together with the frequency, until all frequencies have been transmitted and the return signals received at which time the time trace can be reconstructed by inversely transforming the I and Q values.

Stamm U.S. Pat. No. 4,381,544 describes a serial survey technique wherein microwave pulses of several frequencies are radiated to the ground from an antenna on an airborne platform. Part of each radiated pulse penetrates the ground and is absorbed or scattered and reflected by changes in the subsurface dielectric properties at the interfaces between materials having different dielectric properties. A detector also mounted on the airborne platform senses the reflected signals and has an empirically determined set of reflection criteria for each material interface.

Kyriakos U.S. Pat. No. 4,435,708 discloses a radio altimeter which uses a triangular modulating waveform for a frequency modulated transmitter. Digital means, synchronized with the triangle wave generator, produces a count gate which is at a high logic level during most of the linear portion of the triangle wave period, and which is at a low level during the portion of the period of the triangle wave near the wave peaks. The count gate and the beat frequency, produced by mixing transmitted and received signals, are applied to logic means which modifies the duration of the high level state of the count gate to produce a derived count gate having a high logic level always of such duration as to equal an integral number of cycles of beat frequency signal. The derived count gate is then used to control a beat frequency counter and a precision clock counter. The outputs of these counters are then arithmetically processed to yield digital altitude information free of step error.

Fowler et al. U.S. Pat. No. 4,504,833 discloses a system similar to that disclosed in Fowler et al. U.S. Pat. No. 4,218,678, except that in the receiver portion of the system, the digital signal from the microprocessor and the base periodic signal from the master oscillator are both fed to an offset synthesizer, while only the base periodic signal is fed to a quadrature circuit. The output of the offset synthesizer is mixed with the incoming signal from the receiver antenna and the RF amplifier in a receiver mixer whose output is then fed to a power divider where the signal is fed to both a first and second mixer. The respective in-phase and quadrature signals are also fed to the first and second mixers to provide in-phase and quadrature output signals.

Collins U.S. Pat. No. 4,620,192 describes a radar system wherein a signal from a master oscillator is mixed with a voltage controlled oscillator and the resulting signal is then passed through a filter before being amplified and sent to the transmitter antenna. A portion of the signal being transmitted is also coupled to the receiver to provide a local oscillator signal which is an undelayed replica of the transmitted signal. The incoming signal at the receiver antenna is split and sent to two mixers. The undelayed replica signal is also split and sent to the two mixers, after changing the phase of one of the signals by 90°. The signals are heterodyned in each mixer to respectively provide in-phase and quadrature output signals from the mixers. The signals are then sent to a notch filter which will attenuate ground signals and pass any target return signals centered on a Doppler shift frequency differing substantially from zero frequency. The filtered signals are then digitized and passed to a digital signal processor which includes a digital correlator, an FFT signal processor, a magnitude processor, a memory, and a constant false alarm rate (CFAR) processor. The digital signal processor converts the digitized time domain data into a range/Doppler map and to report CFAR threshold crossings with the map to a digital computer.

Vacanti U.S. Pat. No. 4,670,753 describes a dual channel radar system wherein a transmitted FM signal, which is circularly polarized in one direction, sweeps a predetermined frequency range. The return signal, which is polarized in both directions, is received by the same antenna and the received reflections are mixed with samples of the transmitted signal to produce baseband frequency signals on two channels representing, respectively right and left-circularly polarized reflections. The signals are processed by an FFT element to produce digitized I and Q output signals for each channel. The minimum power measurements for each channel are determined and then compared in order to locate targets in the target area.

However, despite these attempts to improve upon existing commercial radar systems, there still remains a need for providing a radar system which will distribute the transmitted signal power requirements in a manner which will provide an increase in the systems overall average power, resulting in a less complicated, more reliable radar, as well as providing an increase in the system signal to noise ratio. In addition there remains a need for a radar system which is capable of preserving the phase information of the radar return signal and which will take full advantage of digital signal processing techniques which can provide an increase in the target detection ability of the system. Such a system should also provide for more efficient use of transmitted power by generating signals covering only the frequency range in which a practical antenna radiates most efficiently.

SUMMARY OF THE INVENTION

The stepped frequency ground penetrating radar system of the invention comprises an RF signal generating section which is capable of producing stepped frequency signals in spaced and equal increments of time and frequency over a bandwidth or frequency range which matches the frequency range at which a practical antenna radiates most efficiently and serves as a common RF signal source for both a transmitter section and a receiver section of the system. In the transmitter section of the system the signal is processed into in-phase and quadrature signals which are then amplified and then transmitted toward a target.

The reflected signals from the target are then received by an antenna in the receiver section and mixed with a reference signal from the common RF signal source in a mixer. The output from this mixer is then fed through a low pass filter and the DC output from this filter, after amplification and demodulation, is digitized and converted into a frequency domain signal by a Fast Fourier Transform. A plot of the frequency domain signals from all of the stepped frequencies broadcast toward and received from the target yields information concerning the range (distance) and cross section (size) of the target.

The use of a common RF signal source in both the transmitter and receiver sections of the system; the provision of the quadraphase modulator in the transmitter section, rather than in the receiver section, which permits the use of a single channel with a single mixer in the receiver section to compare the RF reference signal with both the received in-phase and quadrature signals; and the provision of a special antenna design to enhance the directivity and gain of the antennas all provide for a more effective radar system for detecting the depth and size of buried objects.

DETAILED DESCRIPTION OF THE INVENTION

Figure 1:
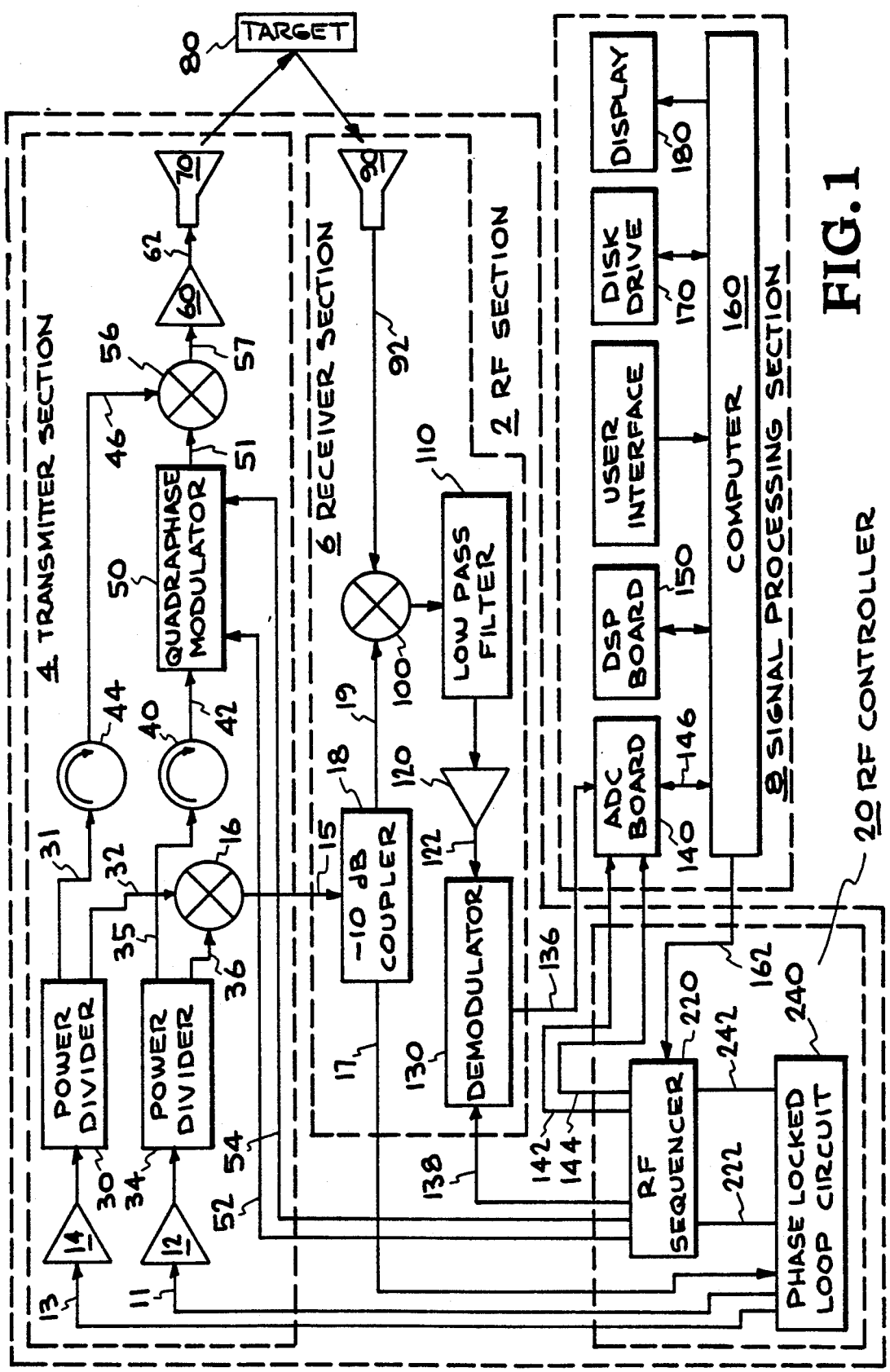
FIG. 1 is a schematic diagram of the stepped frequency ground radar system of the invention.

Referring now to FIG. 1, in general, as well as to FIGS. 1A, 9A, 9B, and 10, the invention provides a stepped frequency ground penetrating radar system wherein a series of stepped frequency signals are generated in RF section 2 comprising RF controller 20, transmitter section 4, and receiver section 6. The signal is converted in transmitter section 4 into in-phase and quadrature RF signals by a quadraphase modulator, and both signals are then broadcast, in turn, to a target from transmitter section 4. The return signals are then received by receiver section 6, where the received signals are mixed with the unmodulated RF signal fed directly to receiver section 6 from transmitter section 4, via line 15. The signals are then processed in a signal processing section 8 to provide both a visual image as well as data storage.

a. RF Section

The RF signal is generated in RF section 2 by a Phase Lock Loop (PLL) frequency synthesizer, comprising RF controller 20, transmitter section 4, and receiver section 6. It is capable of generating signals in steps, e.g., 4.0 MHz steps, over a wide bandwidth, for example, within a range of about 196 MHz to about 708 MHz, i.e., a 512 MHz bandwidth. The Phase Lock Loop (PLL) frequency synthesizer shown in FIG. 1, includes two hyperabrupt varactor-tuned oscillators, 12 and 14, such as Model No. HTO-2000 oscillators available from Avantek, Inc. Oscillator 12 is tuned from 2.296 GHz to 2.82 GHz by a tuning voltage fed into oscillator 12 through line 11 from RF controller 20, as will be described below. A reference voltage from RF controller 20 is fed into oscillator 14 through line 13 to provide an output frequency of 2.1 GHz for oscillator 14.

The outputs of oscillators 12 and 14 are then divided by power dividers 30 and 34, such as a ZAPD-4 Power Splitter from the Mini-Circuits Company. One of the outputs from power splitter 30 and one of the outputs from power splitter 34 are mixed together respectively via lines 32 and 36, in mixer 16, such as an M1K mixer available from the Watkins Johnson Company. The output from mixer 16 is then fed to the receiver section 6, through line 15 to a −10 db coupler 18, such as a ZFDC-10-2 coupler available from Mini-Circuits Company. A feedback signal is returned to the RF controller 20 from coupler 18 via line 17, while the RF signal output from coupler 18 is fed to mixer 100 via line 19. This RF signal is the local oscillator for the receiver section 6, and provides unmodulated frequencies of 196 MHz to 720 MHz as well as frequencies from 4.398 GHz to 4.92 GHz. The high frequencies are out of the bandwidth of the components and are essentially filtered out, leaving only the 196 MHz to 720 MHz frequencies.

b. RF Controller

The RF controller 20, as shown in FIG. 1, consists of 2 modular sections: RF sequencer 220 (which is shown in greater detail in FIGS. 9A and 9B), and phase lock loop circuit 240 (which is shown in greater detail in FIG. 10).

c. RF Sequencer

Figure 9A:
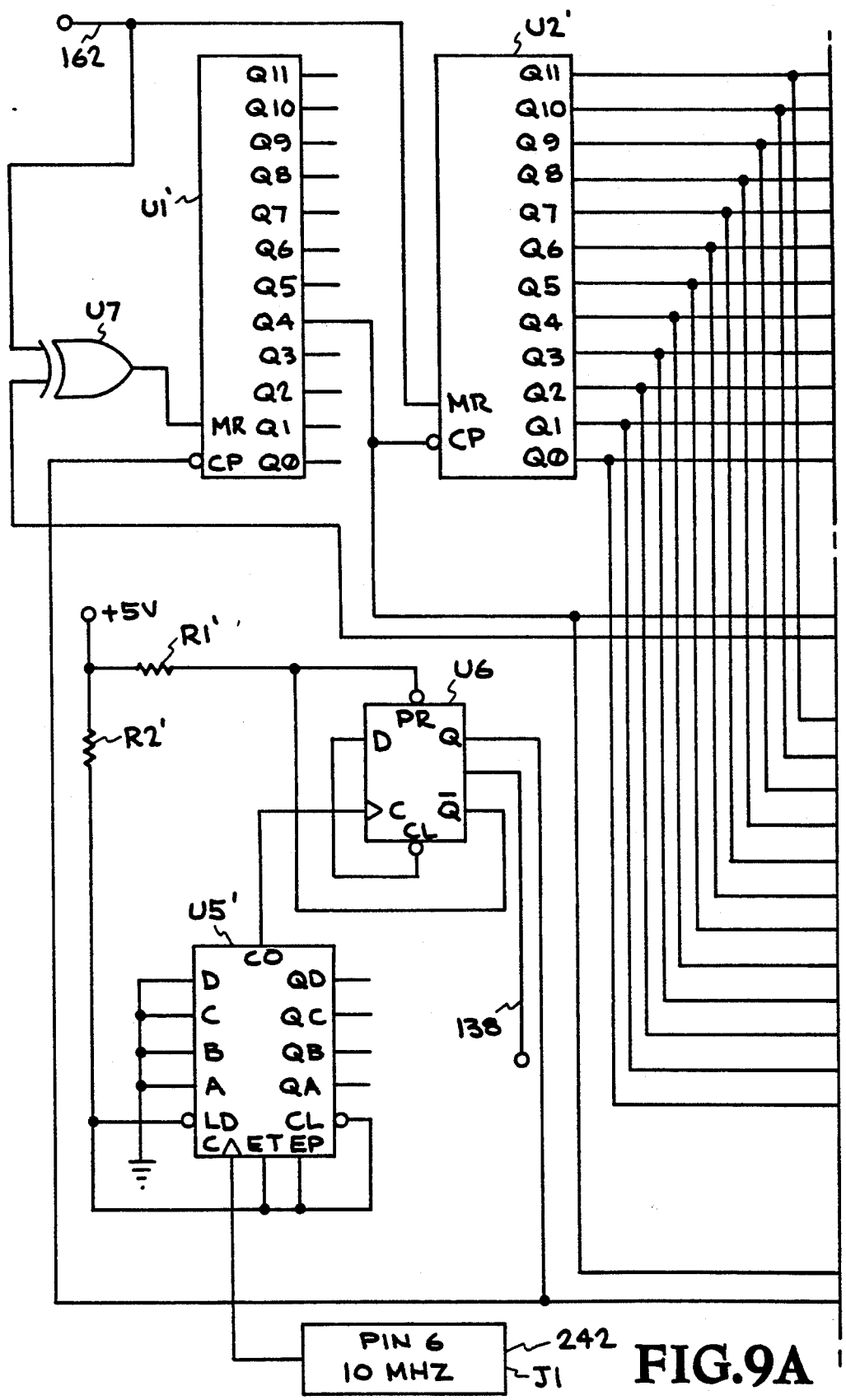
FIGS. 9A and 9B comprise a detailed schematic diagram of RF sequencer 220 shown in block diagram form in FIG. 1.
Figure 9B:
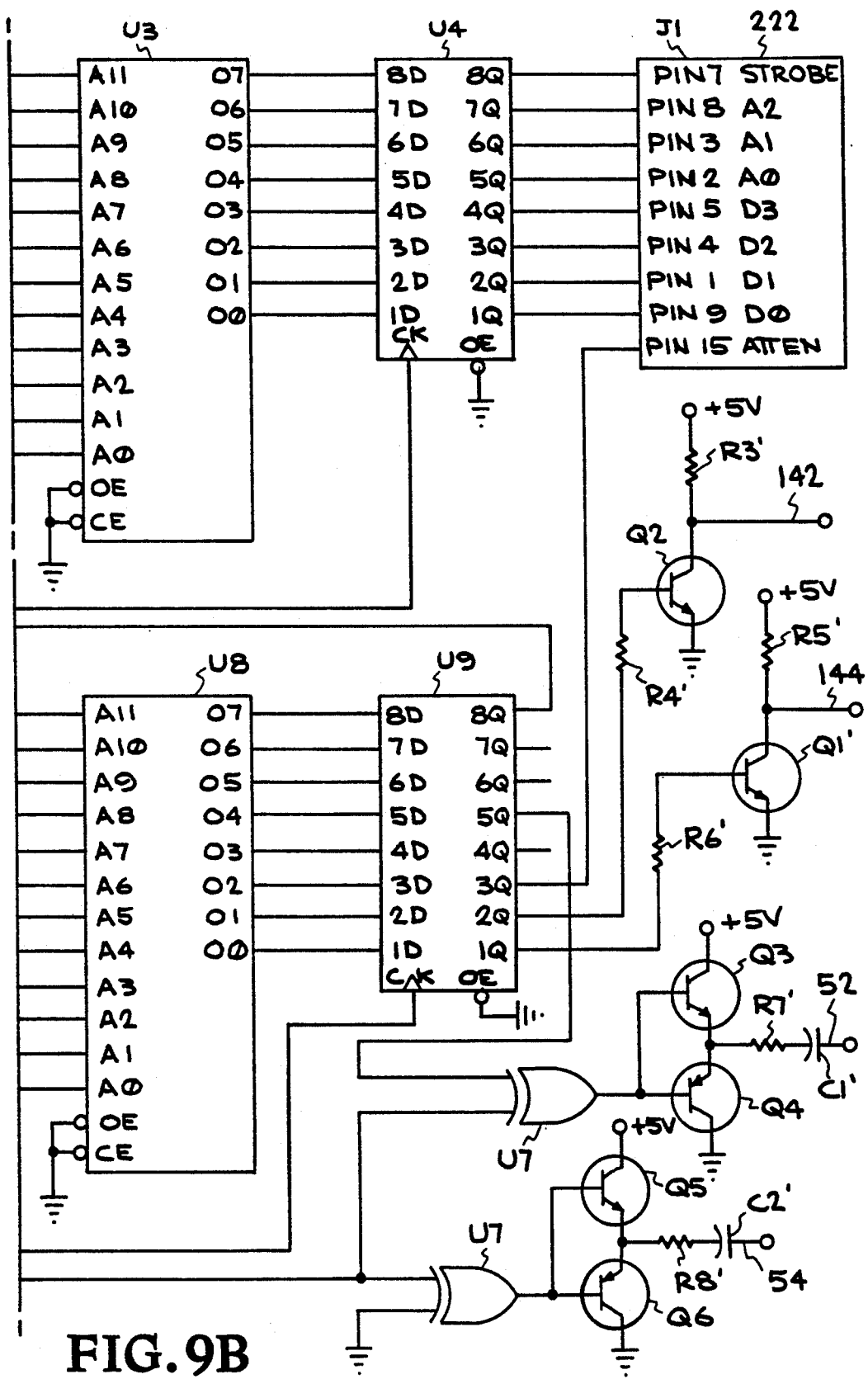

Referring to FIGS. 1, 9A, and 9B, RF sequencer 220 provides 500 KHz control signals to quadraphase modulator 50 via lines 52 and 54. It also provides the address, data, and control lines for changing the output frequency. Additionally it controls the sampling of analog to digital converter 140. RF sequencer 220 functions by using a 10 MHz input clock signal fed into RF sequencer 220 via line 242 on pin 6 of connector J1 from phase lock loop circuit 240.

The 10 MHz clock signal, on line 242, is divided by 10 using synchronous 4-bit decade counter U5' (part no. 74HC160 available from any chip manufacturer such as Texas Instruments, Motorola, National Semiconductor, etc.). The 1 MHz output signal from U5' is then fed to a D flip-flop U6 (part no. 74HC74 also available from any chip manufacturer) configured as a divide by two. The output of flip-flop U6 is a 500 KHz signal that is fed as a reference signal to demodulator 130 via line 138. It is also used to modulate the transmitter output signal via line 52 and 54. The 500 Khz signal is also fed to the input of a 12-bit Ripple-Carry Binary Counter/Divider U1' (part no. 74HC4040 also available from any chip manufacturer). Taking the Q4 output of Counter/Divider U1' divides the 500 KHz input signal by 32 and produces a 15.625 KHz signal. This 15.625 KHz signal is then used as an input to another Ripple-Carry Binary Counter/-Divider U2'. Counter/Divider U2' is used to generate 12 bit addresses. This is done by connecting outputs Q0 through Q11 of U2' to address lines A0 through A11 of two 4096 by 8 erasable programmable read only memory (EPROM) circuits U3 and U8 (part no. 27C32 also available from any chip manufacturer). These EPROMs contain data to change the frequency of the phase lock loop. They also provide trigger and convert strobes for analog to digital convertor board 140. They also control phase lock loop gain and change the transmitted modulation from 0/180 degrees to 90/270 degrees In addition, the EPROMs stop the sequencer when a frequency sweep has been completed. Data lines 00 through 07, from EPROMs U3 and U8 are connected to input lines 1D through 8D of octal D-type flip-flops U4 and U9 (part no. 74HC374 also available from any chip manufacturer), respectively. The 15.625 KHz signal is used to latch the data from EPROMs U3 and U8. This prevents spurious data from being transferred until the address counter stabilizes.

As previously mentioned, EPROM U3 contains data to change the output frequency and reference frequency of phase lock loop 240. The data is transferred to phase lock loop 240 in 4 bit increments to seven different latch addresses through connector J1 (collectively shown as line 222 in FIG. 1). The 4 bit data is always in the lower four bits of the output of EPROM U3, 00 through 03. The latch addresses are always in the next three bits, 04 through 06. The highest bit 07, is used as a write strobe to phase lock loop 240. This information is latched and sent to phase lock loop circuit 240 through connector J1.

The data contained in EPROM U8 is used to control the transmitter modulation, analog to digital converter (ADC) 140, and the loop gain of phase lock loop 240. It also stops the counters when the frequency sweep is completed. The 00 output line signals ADC 140 that a data conversion should take place. The 01 output signals ADC 140 that data conversions are going to take place. The 04 line is used to change the phase of the transmit signal. When this line is high, the phase of the transmitter signal alternates between 0 and 180 degrees, and gives the inphase component. When 04 is low, the phase of the transmitter signal alternates between 90 and 270 degrees, providing the quadrature component. At lower output frequencies phase lock loop circuit 240 has too much loop gain and becomes unstable. To reduce the loop gain, output pin 03 is set high. This attenuates the phase lock loop gain as will be explained further below. When 128 values of inphase and quadrature data for each frequency have been collected, a sweep has been completed. When this happens, 07 is set high and stops counter/divider U1' from dividing, thus stopping RF sequencer 220.

To start another sweep or sequence, computer 160 issues a high pulse on start sweep line 162. This high pulse resets the outputs of counter/dividers U1' and U2' to zero. This, in turn, removes the stop signal from EPROM U8 (because the address is now 0) and when the start sweep pulse returns to a low state, counter/dividers U1' and U2' again start generating the address to execute another frequency sweep.

d. Phase Locked Loop Circuit

Figure 10:
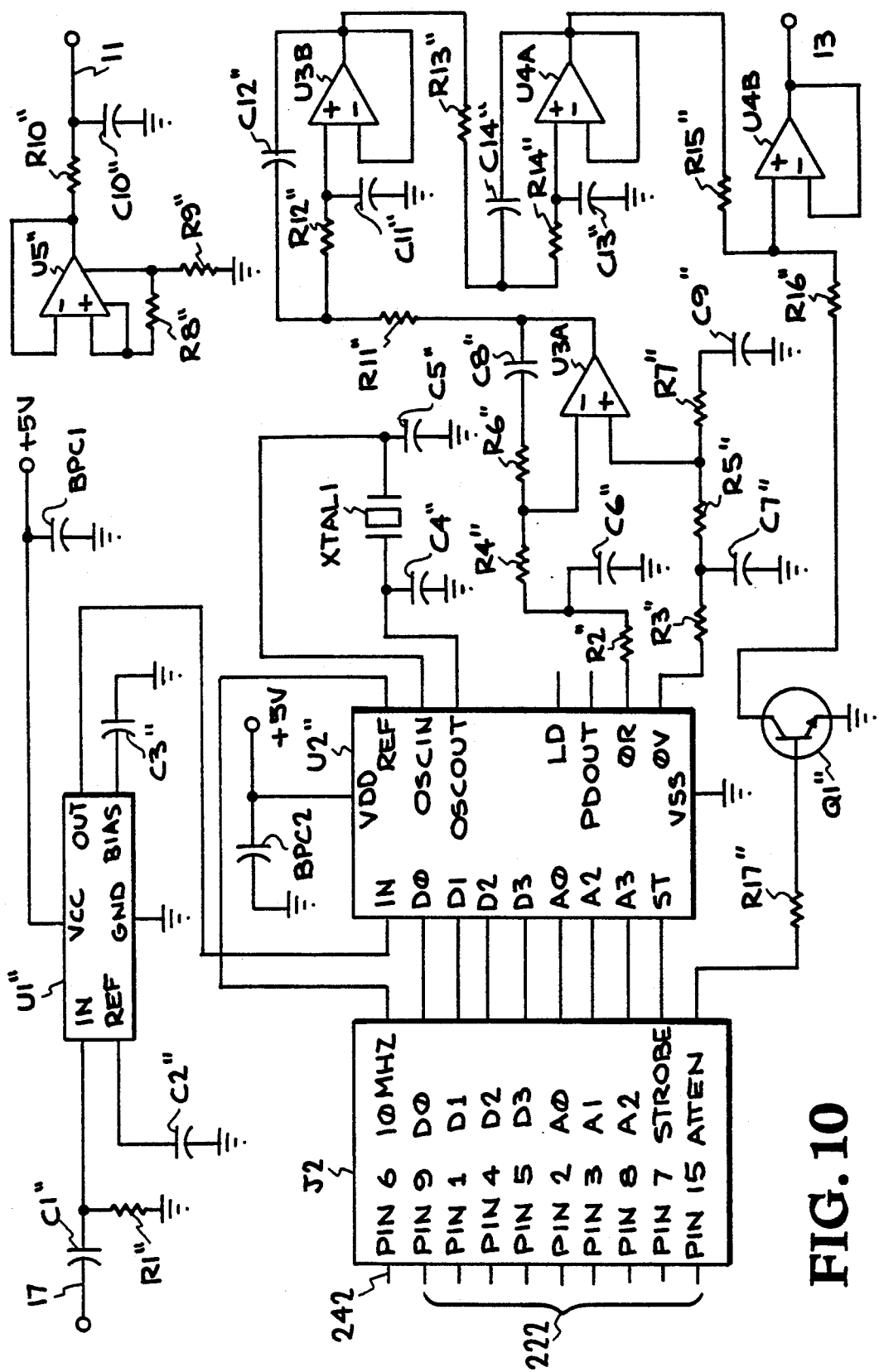
FIG. 10 is a detailed schematic diagram of phase locked loop circuit 240 which is shown in block diagram form in FIG. 1B.

Referring now to FIGS. 1 and 10, the other subsection of RF controller 20, phase lock loop circuit 240, provides the tuning voltages for hyperabrupt varactor-tuned oscillators 12 and 14 via lines 11 and 13. This circuit also takes a reference frequency derived from a 10 MHz crystal, and multiplies it up to the necessary output frequency.

Phase lock loop circuit 240 consists of four different subsections. The first is the divide by N and phase detector section. The next is the integrator loop filter. The third is the prescaler section, and the last is the local oscillator reference voltage section.

The divide by N and phase detector circuit consists of the Motorola MC145145 4-bit data bus input phase lock loop frequency synthesizer U2". The integrated circuit is programmed by a 4-bit input, with a write strobe and address lines. The device has a 12 bit programmable reference frequency divider, a digital-phase/frequency detector, a 14-bit programmable divide by N counter, and the required latch circuitry for accepting the 4-bit input data. It also contains the circuitry for an oscillator when pins 6 and 7 are connected to the terminals of a parallel resonant crystal such as 10 MHz crystal XTAL1 shown in FIG. 10. The buffered output of this oscillator is sent to pin 6 of connector J2 to provide the 10 MHz signal input to RF sequencer 220 shown at pin 6 of connector J1 shown in FIG. 9A (also shown as line 242 in FIGS. 1 and 9A).

The integrator-low pass filter section of phase lock loop circuit 240 consists of four operational amplifiers U3A, U3B, U4A, and U4B (all part no. TL072 and available from any chip manufacturer), transistor Q1" (part no. 2N3904 also available from any chip manufacturer), various capacitors, and resistors, as shown in FIG. 10. The filter section integrates the error signal from the phase detector section and the error signal is then filtered to remove any noise that may be generated from the reference frequency. The low pass filter is a four pole active filter having a bandwidth of approximately 25 KHz. The output at line 13 is fed to oscillator 14.

The prescaler U1" is a Plessey Semiconductor SP8755 divide by 64 integrated circuit. It can operate up to a frequency of 1.2 GHz. The reason a prescaler is used in this circuit is that the input frequency to phase detector U2", coming into phase lock loop circuit 240 from receiver section 6 via line 17, is limited to 18 MHz. The divide by 64 assures the input frequency to phase detector U2" is always below the critical 18 MHz input frequency.

The local oscillator reference voltage is supplied by operational amplifier and voltage reference U5" (part no. LM10 available from National Semiconductor, Inc.), which provides the input voltage to a voltage controlled oscillator. U5" has been configured for an output voltage of approximately 3 volts. The voltage produces a local oscillator frequency of about 2.3 GHz which is fed to oscillator 12 via line 11.

The four subsections comprising phase lock loop circuit 240 function or interact together as follows: First a start sweep signal is sent to RF sequencer 220 from computer 160 on line 162. This results in a reference frequency divider value of 160 programmed into phase lock loop synthesizer U2". The initial divide by N value is derived by dividing the starting output frequency by the frequency step size (4 MHz). Therefore, the starting divide by N value is 49, which produces an output frequency of 196 MHz.

Once the divide by R (reference; frequency) and divide by N values have been programmed into phase lock loop synthesizer U2", the phase detector in the chip compares the phase of the reference frequency to the phase of the input signal, after it has been divided by prescaler U1". If the phase of the two signals are the same then the phase detector outputs $\phi V$ and $\phi R$ of U2" will essentially remain high indicating that no error correction is necessary.

If the input frequency phase is greater than the phase of the reference frequency, then $\phi V$ pulses low and $\phi R$ remains high. If the phase of the input frequency is less than that of the reference frequency, then $\phi R$ pulses low and $\phi V$ remains high. These pulses are integrated by operational amplifier U3A, which provides an error signal that is proportional to the difference in phase of the reference frequency and the input frequency.

The error signal is filtered further by a fourth order Butterworth low pass filter consisting of operational amplifiers U3B and U4A. The components selected produce a cut off frequency of 25 KHz with a roll off of 24 dB per octave. This is important to eliminate the 62.5 KHz reference signal that would increase the noise on the error correction signal.

As previously mentioned, when the phase locked loop is at the lower output frequencies, the loop gain is too high and the loop becomes unstable. To compensate for this, transistor Q1" is turned on providing a voltage divider with resistors R15" and R16". This attenuates the error signal enough to stabilize the loop gain. At higher output frequencies transistor Q1" is turned off, returning the loop to normal. The signal is buffered with operational amplifier U4B that is configured as a voltage follower.

e. Transmitting Section

The other RF signal output from divider 34 is fed to isolator 40 via line 35. The signal is then fed to the quadraphase modulator 50 via line 42. Isolator 40 (and isolator 44) comprises a commercially available signal isolation device, such as, for example, a Model 50A3001 Isolator available from Track Microwave, Inc. Isolator 40 functions to provide a minimum of 20 db of isolation between input line 35 and output line 42 (or between input line 31 and output line 46 for isolator 44) to insure that the 500 KHz modulation frequency is not present on the unmodulated frequency input, line 15, to receiver section 6.

Quadraphase modulator 50 is commercially available from Triangle Microwave, Inc. as Model RR-24. Quadraphase modulator 50 is also controlled by RF controller 20, and is used to phase modulate the transmitted signal by alternately converting the signal entering modulator 50 from line 42 into an in-phase signal, which is either 0° or 180°, or a quadrature phase shifted signal, which is either 90° or 270°. The purpose of these modulations is to provide for an IF frequency in receiver section 6.

Data acquisition begins by RF controller 20 alternating the phase of modulator 50 between 0° and 180°. Each phase is transmitted for a period of time of 1 microsecond. While these in-phase signals are produced, data acquisition takes place as described below.

Next the RF controller alternates the phase of modulator 50 between 90° and 270°. Again each phase is transmitted for a period of 1 microsecond. While these quadrature signals are produced, data acquisition again takes place. The RF controller then shifts to the in-phase signal modulation, and the entire sequence is repeated.

These phase shifted signals are fed, via line 51, to mixer 56, such as an M1K mixer available from the Watkins Johnson Company. This signal is mixed with the output signal of isolator 44, via line 46, and provides transmitter section 4 with modulated frequencies of 196 MHz to 720 MHz as well as frequencies from 4.398 GHz to 4.92 GHz. Once again the high frequencies are out of the bandwidth of the components and are essentially filtered out, leaving only the 196 MHz to 720 MHz frequencies. The output of mixer 56 is fed via line 57 to amplifier 60, which may be a conventional microwave amplifier such as a Model WJCA63 amplifier available from the Watkins Johnson Company. The amplified signals are then transmitted through transmitting antenna 70, which will be described in more detail below, toward a target 80, such as a buried object.

f. Receiving Section

The return signals are then received by a receiving antenna 90, which also will be described below, and mixed in a mixer 100, via line 92, with the unmodulated receiver local oscillator signal of the same frequency via line 19. Mixer 100 comprises a commercially available mixer available from the Watkins Johnson Company as Model M1G. Mixer 100 down converts the RF signal to a 500 KHz IF frequency. The IF frequency is then passed through a low pass filter 110, having a cutoff frequency of about 1 MHz. The AC signals emerging from filter 110 are then passed through an IF amplifier 120, having a bandpass filter which passes the 500 KHz IF signal.

g. Demodulator

Figure 1A:
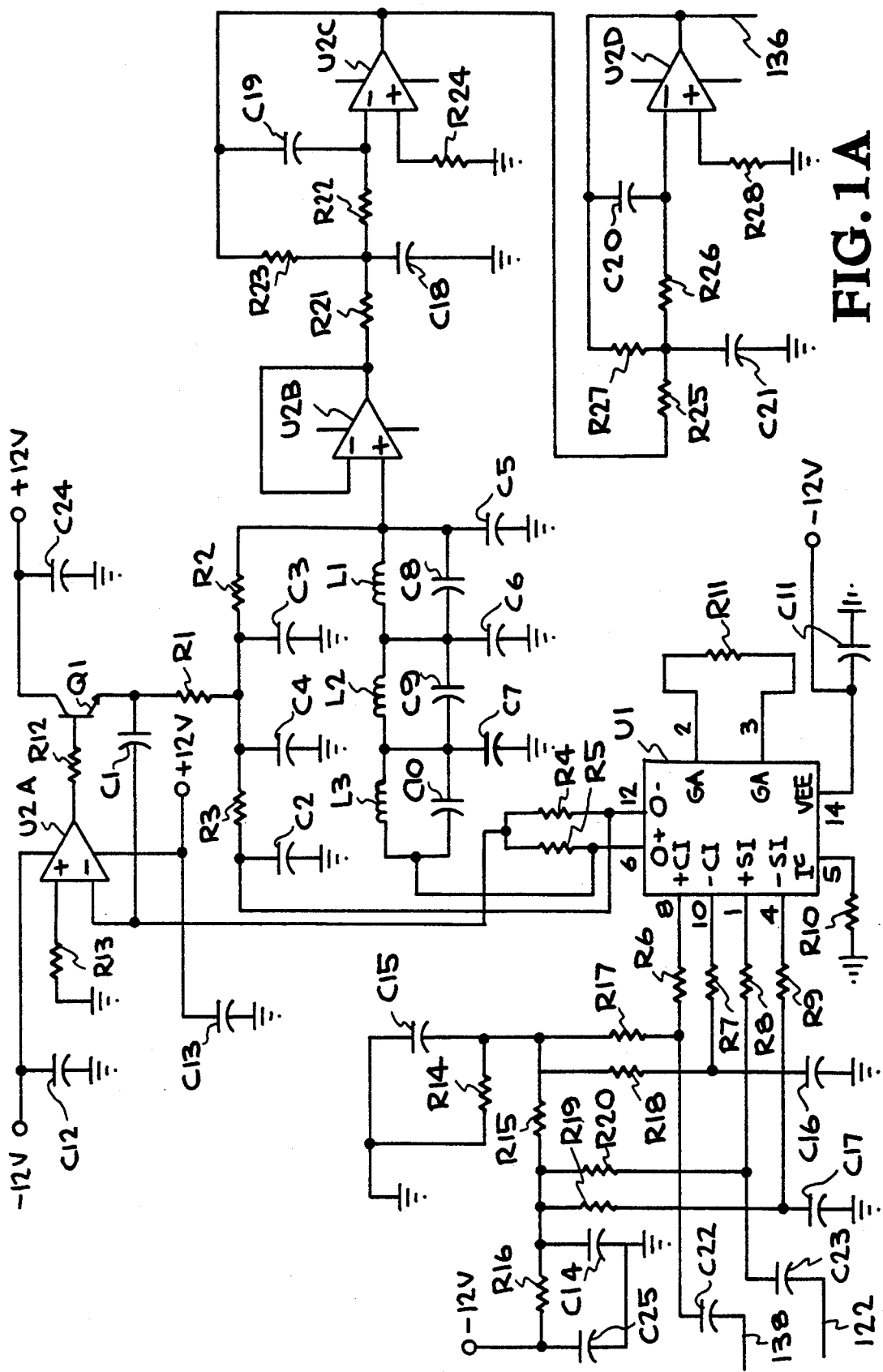
FIG. 1A is a detailed schematic diagram of a portion of the diagram of FIG. 1 showing demodulator 130 in more detail.

Referring now to FIGS. 1 and 1A, the amplified return signal is fed through a demodulator 130 which hetrodynes the IF signal to baseband, i.e., D.C. As shown in FIG. 1, the IF signal, entering demodulator 130 from amplifier 120 via line 122, is mixed with a 500 KHz signal, entering demodulator 130 from RF controller 20 via line 138, in active mixer U1 in alemodulator 130 to produce sum and difference frequency terms. A high order butterworth lowpass active filter in the circuitry shown in FIG. 1A is then used to eliminate the sum frequency term.

Active mixer U1 comprises a mixer capable of providing conversion gain and which can handle large input signals with relatively low local oscillator power. Such an active mixer is available from Motorola as part No. MC1496. The reason it is desirable to take gain in the conversion, rather than at DC, is that 1/F noise is not amplified.

In the stepped frequency ground penetrating radar system of the invention, special effort is made to force the DC operating point of the output to exactly 0 volts DC. Any Dc offset generated by demodulator 130 can produce a large DC component when the Fast Fourier Transform is calculated. One way to control the DC operating point is to place the bias circuitry for the active mixer within a feedback control system. This way the operating point is always compared with a known reference. Then any error in the DC operating point is corrected.

Mixer U1, shown in the schematic of FIG. 1A, is a typical Gilbert cell four quadrant multiplier with a current mirror bias network. However, the biasing of mixer U1 is carried out in a unique manner. It is biased so that the constant DC voltage drop across the mixer load resistors R2 and R3 can be adjusted by U2A and Q1 acting as a servo amplifier.

A more common way of using a Gilbert cell mixer to obtain a DC output is to take the difference between the two outputs of the mixer with a difference amplifier. While this method works and is simple to implement, the difference amplifier used must have enough bandwidth to completely cancel the RF image frequencies. Unfortunately, wide bandwidth difference amplifiers suffer from poor DC performance resulting in large DC offsets.

The described and illustrated servo mixer concept removes the difference amplifier from the signal path. Instead slow operational amplifiers, such as the illustrated TL074 amplifiers are used with a low offset voltage to adjust the operating point of mixer U1 to 0 volts DC. The improvement in DC performance results in increased bias circuit complexity. Additionally greater constraints are placed on the selection of the bias voltages.

The value of resistor R18 has been chosen to set the bias current of the Gilbert cell to be 1 milliamp. This current is mirrored internally so there is always 1 milliamp flowing into pins 6 and 12 of mixer U1. This produces a 10 volt drop across the 10K load resistors R2 and R3. Although the 10 volt drop is constant, the voltage at pins 6 and 12 of mixer U1 is still arbitrary. Operational amplifier U2A, comprising part no. TL074 available from any chip manufacturer), forms a summing inverting integrator. The voltages at the output pins 6 and 12 of mixer U1 are added by resistors R4 and R5. Since these two outputs are 180 degrees out of phase, this summation cancels the signal leaving only the DC offset. The DC offset is compared with ground through resistor R13 and the difference is integrated by capacitor C1. The output of operational amplifier U2A drives transistor Q1, comprising part no. 2N3904, also available from any chip manufacturer. Transistor Q1 delivers the current required by mixer U1. The voltage on capacitor C4 is adjusted until the error between pins 2 and 3 of operational amplifier U2A is zero volts.

The net effect is that the DC voltage at pins 6 and 12 of mixer U1 is forced to 0 volts DC by the servo circuit. The carrier port bias voltage must always be at least 2 volts more negative than the minimum expected voltage at pins 6 and 12 of mixer U1 to keep the top cell transistors (within mixer U1) out of cutoff. Similarly, the signal port bias voltage (pin 1 of mixer U1) was chosen to be −10 volts and the carrier port bias voltage (pin 8 of mixer U1) was set at −7 volts. This provides 3 volts between carrier and signal port bias. This allows a maximum output signal of 10 volts peak to peak. The bias voltages are set by resistor R14, R15, and R16. Resistors R17, R18, R19, and R20 bias the ports of the gilbert cell while making the bias network a high impedance to the 50 ohm LO and RF input ports. The 47 ohm base stabilization resistors R6, R7, R8, and R9 stabilize the Gilbert cell preventing spurious oscillations. Capacitors C16 and C17 force the unused signal and carrier port pins to be AC ground.

Gain adjust resistor R11 sets the conversions gain of the mixer to be 10 volts per volt. The relationship for conversion gain is given in the following equation:

$$Av = \frac{RL}{2Vt/Ie + Rg}$$

where Ie=1 milliamp, Vt=25 millivolt, RL=10K, and Rg is R11.

The passive filter at the output of the mixer has been designed to have a flat response for frequencies below 20 KHz with an elliptic stopband. This was done to keep the inductor values reasonably small. The filter is designed in two parts. First inductors L1, L2, L3 and Capacitors C6 and C7 are designed as a 200 KHz Butterworth low pass filter with a 10K ohm input impedance and an open circuit load. Second, capacitors C8, C9, and C10 are chosen to resonate with inductors L1, L2, and L3 creating zeros in the transfer function at 95 KHz, 53 KHz, and 22.8 KHz. This lowers the cutoff frequency to roughly 20 KHz while maintaining the flat response in the pass band and providing a very sharp cutoff characteristic. The function of this filter is to eliminate 500 KHz carrier leakage, and the sum product terms. The remainder of the circuit is a fourth order Butterworth active low pass filter with a cutoff frequency of 10 KHz. Operational amplifier U2B buffers the mixer with its servo circuit from the filter. Operational amplifiers U2C and U2D are configured as second order multiple feedback low pass filters.

h. Signal Processing Section

The baseband output signals from demodulator 130 are then digitized in an analog to digital convertor 140, such as a DT 2801/5716 A/D board available from the Data Translation Company. The digitized signal is then converted into frequency domain equivalents using a Fast Fourier Transform (FFT) structure 150, such as an IBM PC based Digital Signal Processing (DSP) board using a DSP chip such as a Texas Instruments TMS32010 DSP chip.

The data is then sent to a computer 160 where it may be both stored on a disk 170 and/or viewed on a display 180. Computer 160 controls the RF section of the system by telling RF controller 20 when to start each sweep of frequencies. Computer 160 and ADC unit 140 also cooperate in the sequential digitizing, processing, display, and storage of the data. Computer 160 fills an array with the digitized data from ADC unit 140 and then, when the array is full, passes on the full array of data to the DSP board in FFT structure 150 which processes the data and then signals computer 160 to display and optionally store the information.

i. Antenna

Figure 6:
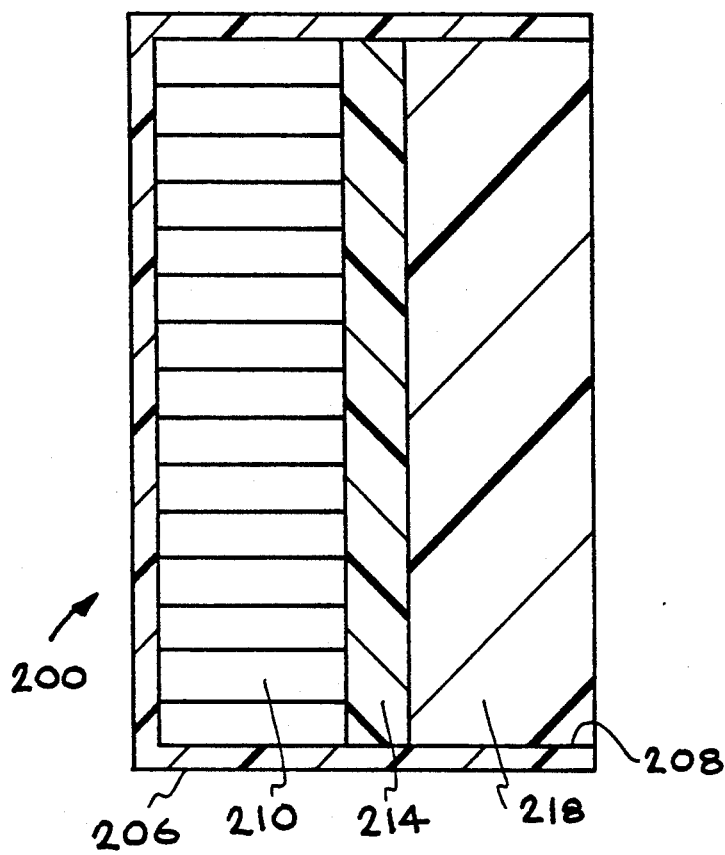
FIG. 6 is a side-section view of the antenna structure used for both the transmit and receive antennas.
Figure 7:
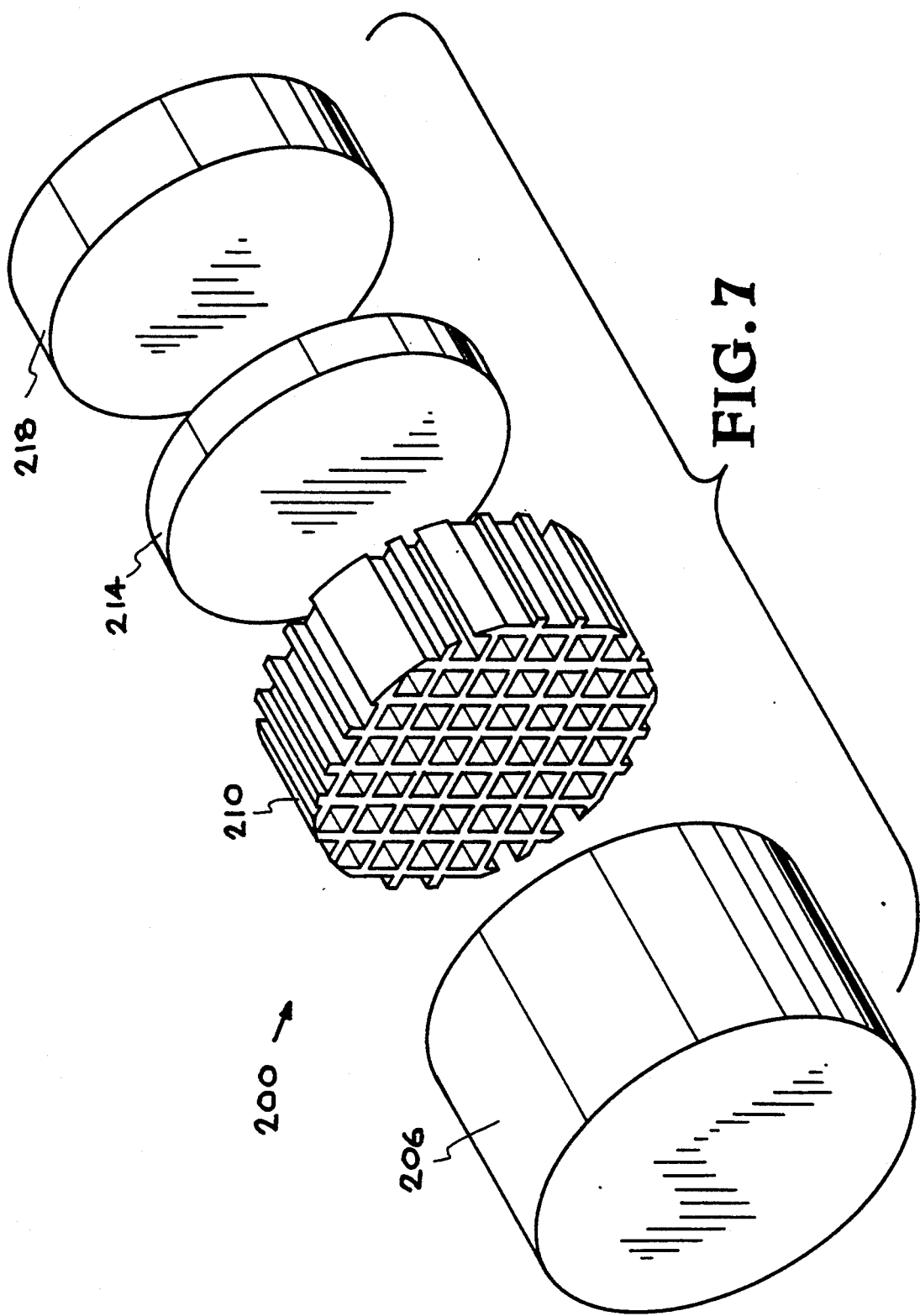
FIG. 7 is an exploded view of the antenna of FIG. 6.

Referring now to FIGS. 6 and 7, the special antenna structure used for both the transmit and receive antennas is generally designated at 200 comprising a cavity 206 containing a grid 210, an electrode 214, and a dielectric material 218.

Cavity 206 is formed from either a conductive material, e.g., copper or aluminum or is formed from a nonconductive material having an inner conductive liner 208, such as a copper layer formed over the inner surface of cavity 206. For example, cavity 206 may comprise a molded plastic or phenolic type material such as used for printed circuit boards and to which a copper coating will satisfactorily adhere. Cavity 206 may range from about 12 cm to about 14 cm in length or depth and from about 30 cm to about 32 cm in inner diameter (ID).

Grid 210, which has an egg crate-like shape, is either constructed of an electromagnetic absorbing material such as carbon or ferrite, or is constructed of a non-conductive material such as, for example, cardboard or a molded plastic which is then coated with an electromagnetic coating material such as a carbon-containing paint. The purpose of grid 210 is to absorb RF frequencies ranging from about 196 MHz to about 720 MHz and to eliminate or mitigate a reflection from the back wall of the cavity which would result in undesirable suppression of the front lobe. To accomplish this, the grid openings, which may be circular or of any polygonal cross-section, have an average width of from about 30 mm. to about 40 mm. The depth or thickness of grid 210 should range from about 8 cm. to about 12 cm., depending upon the depth of cavity 206. Usually the depth or thickness of grid 210 will be from about two-thirds to about three-quarters of the depth of cavity 206. The diameter of grid 210 should be just slightly smaller than the ID of cavity 206 so that grid 210 will snugly fit therein.

Figure 8:
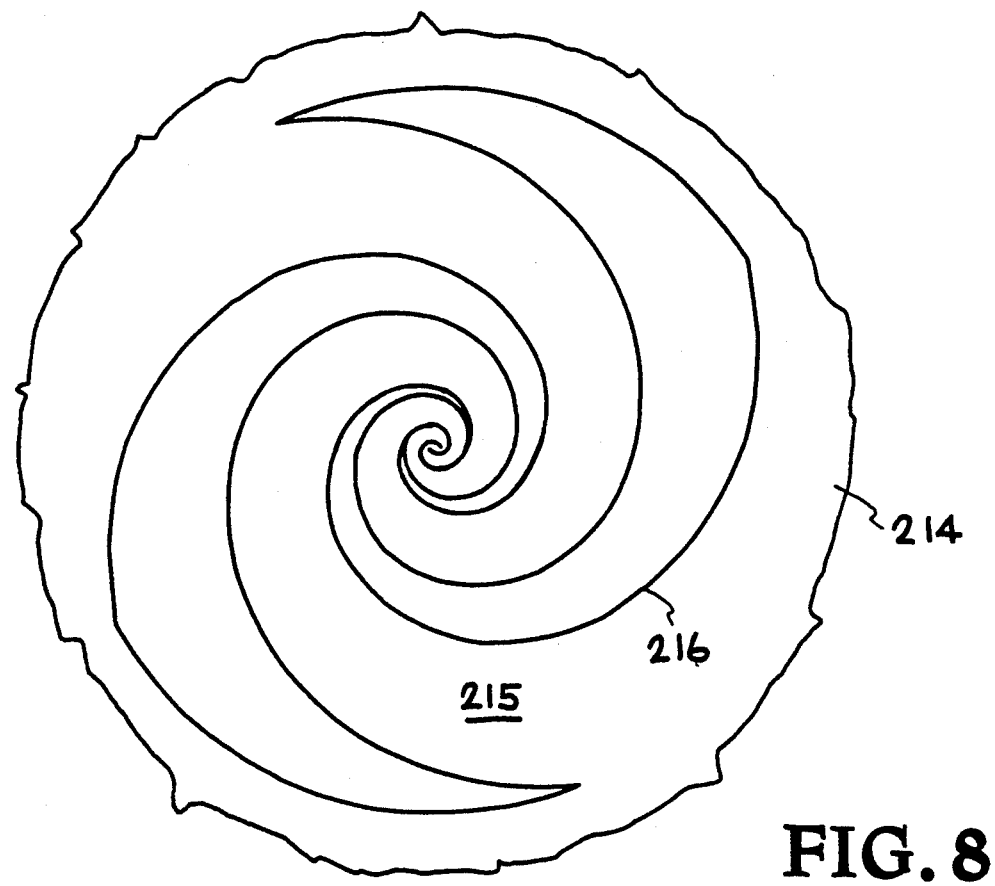
FIG. 8 is a top view of the metal pattern on the electrode in the antenna structure of FIGS. 6 and 7.

Electrode 214 may comprise a metallic disc or may comprise a metal-coated insulating material, e.g., a copper-coated fiberglass disc, having a diameter just slightly smaller than the ID of cavity 206 so that electrode 214 will snugly fit therein. The thickness of electrode 214 may vary from about 2 mm. to about 4 mm. As shown in FIG. 8, electrode 214 preferably comprises a printed circuit board 215 with a standard log spiral antenna metal pattern 216 etched upon it. This planar spiral antenna provides a multi-octave frequency bandwidth which can be designed to match the operating bandwidth of the system.

Dielectric spacer 218 comprises a low loss material, such as Syntactic foam loaded with inductive filler available from Cummings, Inc., having a dielectric constant of at least about 8, preferably about 9 (Er=9). A dielectric spacer 218 formed of this type of material provides better impedance matching to the ground which increases the radiating efficiency of antenna 200. Such dielectric loading of antenna 200 has the added benefit of permitting a decrease in the antenna's physical aperture which makes for a smaller, more practical antenna with a narrower front lobe.

The thickness of dielectric spacer 218 should range from at least 2.5 min. up to about 3.5 min., depending upon the depth of cavity 206 and the overall thickness of grid 210 and electrode 214. Typically the thickness of dielectric spacer 218 will range from about one fifth to one fourth of the depth of cavity 206. The diameter of dielectric spacer 218 will be just slightly smaller than the ID of cavity 206 to provide for a snug fit of dielectric spacer 218 within cavity 206.

j. Operation of System

The stepped frequency ground penetrating radar system of the invention may be used to detect buried objects which may be natural objects such as oil, coal, and ore deposits, or the absence of same such as underground caverns, rivers, etc., or to detect the presence of man-made objects such as buried ordnance in former target areas, buried waste, underground storage tanks, pipes, sewer lines, buried cables, etc.

The operation of the stepped frequency ground penetrating radar system in detecting such objects or structures is based on the variation in response of signals of differing frequency which are broadcast to and reflected from such objects or structures. When a signal is broadcast from the transmit antenna to a target and then reflected back to the receive antenna, the reflected signal is delayed by its time of flight. This time of flight concept may also be referred to as a phase path difference measurement from which one obtains range information.

Assuming that the path length of the transmit signal comprised of 31, 44, 46, 57, 60, 62, 70 and 35, 40, 42, 50, 51, 56, 90, and 92, is the same as the sum of the receive path length comprising 32, 36, 16, 15, 18, and 19; at a given frequency $F_0$, the output of mixer 100 will be:

$$\text{MIXER}_{OUT} = \cos(F_0) \times \cos(F_0 + \phi) \tag{2}$$

where $\Phi$ is the phase path length from transmit antenna 70 to the target and back to receive antenna 90. This equation can then be rewritten as:

$$\text{MIXER}_{OUT} = \tfrac{1}{2}(\cos(2F_0 + \phi) + \cos(\phi)) \tag{3}$$

When this output signal from mixer 100 is passed through low pass filter 110, which has a cut off frequency which is much less than $F_0$, the output signal from low pass filter 110 may be written as:

$$FILTER_{out} = \cos(\phi) \quad (4)$$

Figure 2:
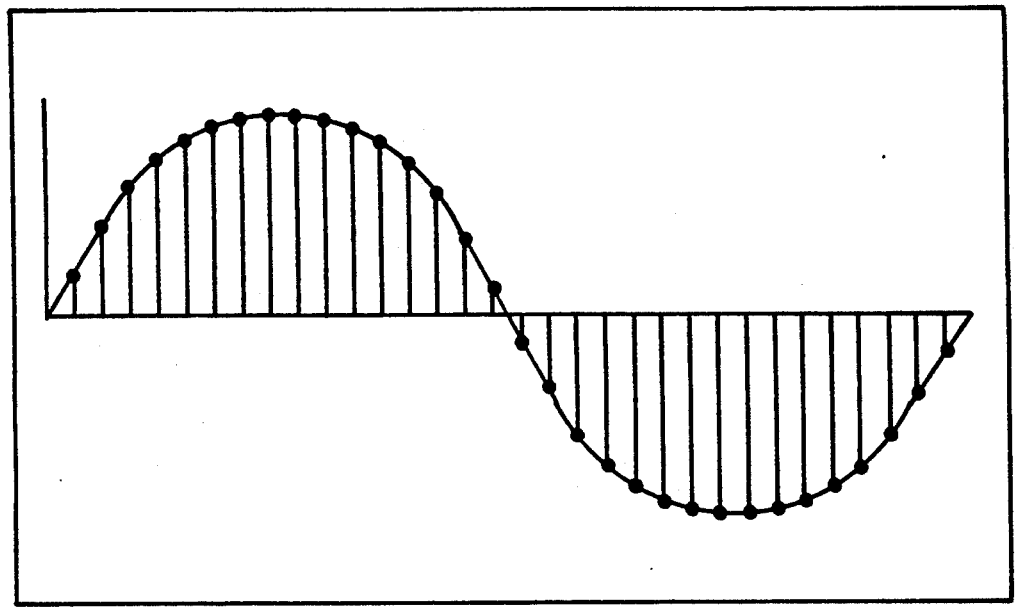
FIG. 2 is a plot of DC voltages representing a spectrum of frequencies reflected off a target.
Figure 3:
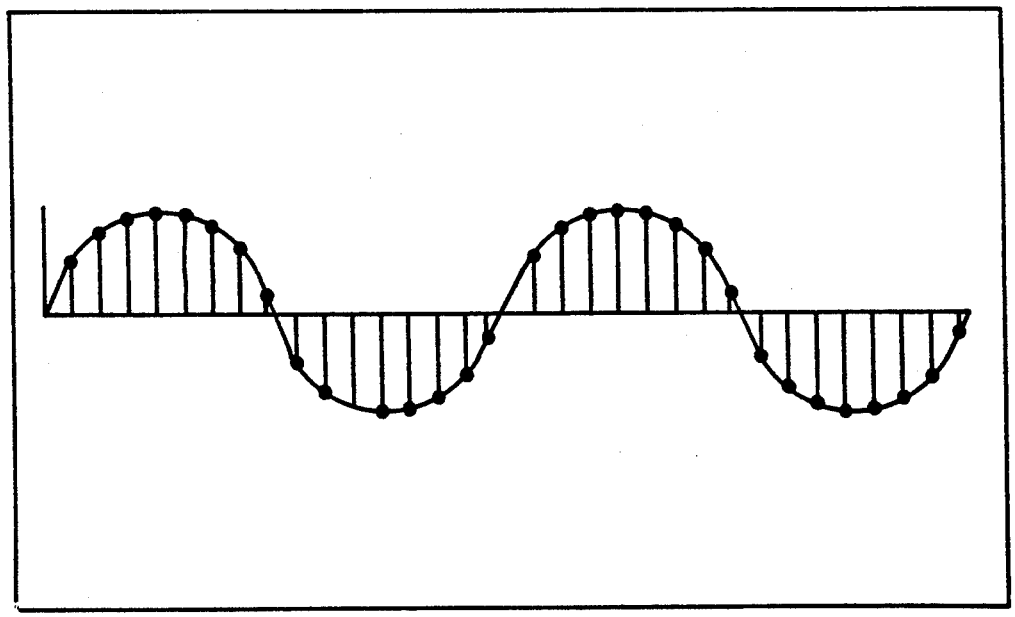
FIG. 3 also is a plot of DC voltages representing a spectrum of frequencies reflected off a target which is located at a greater distance from the antennas than the target represented by the data in FIG. 2.

Since the target distance is fixed, the phase path at a given frequency is also fixed. Therefore, for any given frequency the phase path is equal to a phase value which is represented by a DC voltage. If the RF signal is stepped to a second frequency $F_1$, the phase path length, $\phi$ will be different at this new frequency and the output of low pass filter 110 in equation (4) above will be a different DC voltage. When the RF source is stepped in equal increments from ($F_0$ to $F_1$ to ... $F_n$) the DC output values from filter 110 for the respective stepped frequencies, when plotted, take on the appearance of a sine wave as shown in FIGS. 2 and 3, due to the periodic nature of the phase (0–360 degrees).

When a 500 KHz modulation frequency is used in the transmitted signal and this modulated signal, after being received, is fed into mixer 100 via line 92 and mixed with the unmodulated signal feeding into mixer 100 from coupler 18 via line 19, the output of mixer 100 is the sum and the difference frequencies of the inputs 19 and 92. Equation (2) above may then be rewritten as:

$$MIXER_{out} = [(F_r + 500\ KHz) + F_t] + [(F_r + 500\ KHz) - F_t] \quad (5)$$

where $F_t$ is input 19 and ($F_r + 500$ KHz) is input 92 to mixer 100. Since the transmitted and received signals are at the same frequency, $F_t = F_r$, Equation (5) may be rewritten as:

$$MIXER_{out} = (F + F + 500\ KHZ) + (F - F + 500\ KHz) \quad (6)$$

Reducing Equation (6) once more yields:

$$MIXER_{out} = (2F + 500\ KHz) + (500\ KHz) \quad (7)$$

This output signal is then sent through low pass filter 110 which has a cutoff frequency of approximately 1 MHz and removes the high frequency component of the signal. Therefore the output of the low pass filter (LPF) is described as:

$$LPF_{out} = 500\ KHz \quad (8)$$

When the transmitted signal is modulated in-phase (0° and 180°), the 500 KHz signal will contain in-phase target information. When the transmitted signal is modulated between 90° and 270°, the 500 KHz signal will contain quadrature target information. The generation of this 500 KHz intermediate frequency allows considerable amplification of the signal without increasing the 1/F noise. If there were no intermediate frequency (IF), and the signal was mixed directly to DC and amplified, the overall noise in the system would be increased since the 1/F noise would be much larger. The IF signal is amplified by IF amplifier 120.

After 500 KHz demodulation, the DC values obtained for each frequency step (change in phase) are then digitized and the digitized time domain data is then converted into its frequency domain equivalent using Fast Fourier Transform (FFT) structure 150. Once the data is in a frequency domain representation, the range of a target is a function of the frequency of the sampled sine wave. Closer targets produce smaller phase changes because the path from transmit antenna 70 to the target to receive antenna 90 is shorter. This results in a lower frequency sine wave as shown in FIG. 2. In contrast, a target at a greater distance will produce larger phase changes resulting in the higher frequency sine wave shown in FIG. 3.

Figure 4:
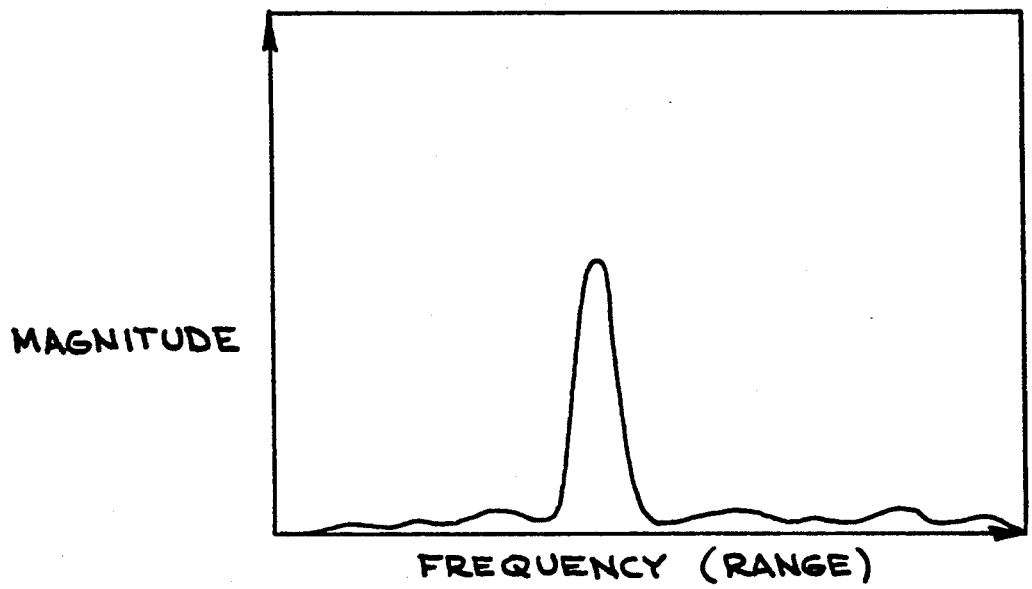
FIG. 4 is a graph plotting the frequency domain data derived from the DC voltages plotted in FIG. 2, showing both the distance and size of the target.
Figure 5:
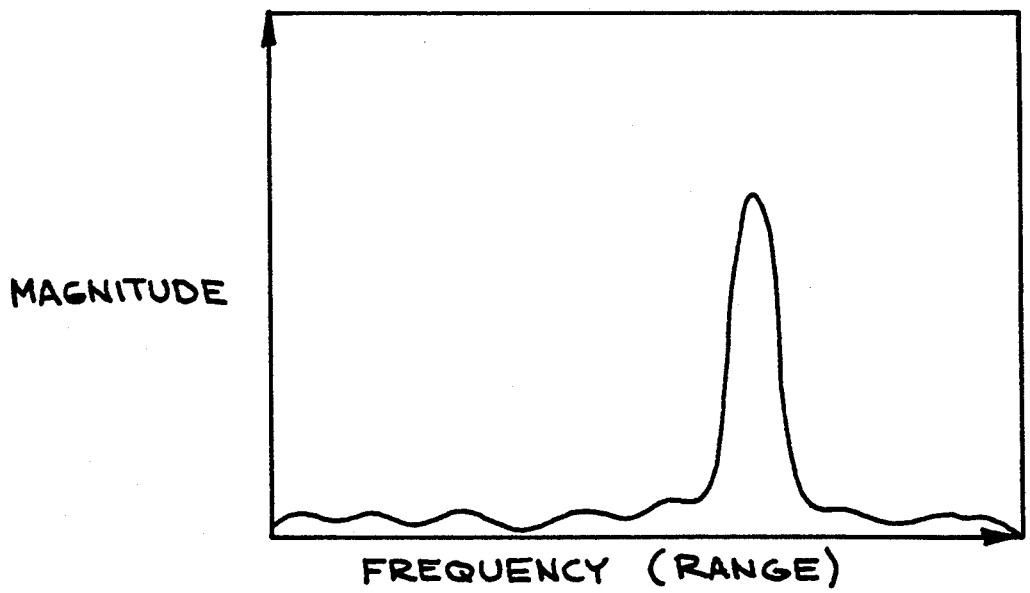
FIG. 5 is a graph plotting the frequency domain data derived from the DC voltages plotted in FIG. 3, showing both the distance and size of the target.

FIGS. 4 and 5 show the frequency domain representations of FIG. 2 and 3 respectively. Thus, as shown in FIG. 5 (corresponding to the higher frequency sine wave of FIG. 3), the frequency spectra moves to the right for deeper targets (along the abscissa of the graph), while the peak shown in FIG. 4 (corresponding to the lower frequency sine wave of FIG. 2) is shown further to the left, indicating that the target is closer or at a more shallow depth. The magnitude of the frequency spectra is proportional to the reflectively, or radar cross section of the target.

It will be noted that unlike the prior art such as Fowler et al U.S. Pat. No. 4,218,678, in the stepped frequency ground penetrating radar system of the invention, a single RF source or generator (synthesizer) is used to provide the same signal to both the transmitting and receiving portions of the system. The advantage of this (other than the obvious advantage of cost) is that with a single signal generator, the frequency and amplitude of the signal being fed to the transmit portion of the system is identical to the frequency and amplitude of the signal being fed to the receive portion of the system, i.e., one does not need to synchronize the output of two different signal generators or synthesizers.

It will also be noted that only a single mixer is used in the receiver portion of the stepped frequency ground penetrating radar system of the invention for both the in-phase and quadrature signals, again unlike the prior art such as Fowler et al. U.S. Pat. No. 4,218,678, where an in-phase signal and a quadrature signal are each respectively mixed in separate mixers with split portions of the incoming signal from the receive antenna. While the provision of in-phase and quadrature signals provides a phase modulation which permits maintenance of a coherent, complex time domain signal, by phase modulating the in-phase component between 0° and 180°, and between 90° and 270° for the quadrature component, the use of the same mixer, or same channel, in accordance with the invention, for mixing both the in-phase and quadrature received signals with the signal from coupler 18 again provides both an economical advantage as well as a technical advantage.

In the stepped frequency ground penetrating radar system of the invention, both the in-phase and quadrature signals, being fed through the same mixer, are subject to the same variations in response and/or other operating parameters, unlike the prior art, whereby differences between the signals are not due to artifacts of the components used in two different channels, but rather due to the phase differential between the radar return of the in-phase and quadrature signals.

Thus, the stepped frequency ground penetrating radar system of the invention provides an improved radar system wherein anomalies in geophysical media may be detected through the use of frequency modulated continuous wave coherent radar wherein a single RF source is used for both the transmit and receive portions of the systems, in-phase and quadrature signals are generated in the transmitter portion of the system whereby a single channel mixer can be used to compare the reflected in-phase and quadrature signals with the reference signal from the RF source, and specially designed antennas maximize the transmission and reception of the system.

While a specific embodiment of the stepped frequency ground penetrating radar system of the invention and method of using same has been illustrated, modifications and changes of the apparatus, parameters, materials, etc. will become apparent to those skilled in the art, and it is intended to cover in the appended claims all such modifications and changes which come within the scope of the invention.

APPENDIX

FIGURE 1A

| | | | | |
|---|---|---|---|---|
| C1 = 1 μF | R1 = 10 Ω | L1 = 18 mH | U1 = MC1496 | Q1 = 2N3904 |
| C2 = 0.1 μF | R2 = 10K Ω | L2 = 18 mH | U2A = TL074 | |
| C3 = 1 μF | R3 = 10K Ω | L3 = 5.6 mH | U2B = TL074 | |
| C4 = 10 μF | R4 = 20K Ω | | U2C = TL074 | |
| C5 = 150 pF | R5 = 20K Ω | | U2D = TL074 | |
| C6 = 150 pF | R6 = 47 Ω | | | |
| C7 = 82 pF | R7 = 47 Ω | | | |
| C8 = 27 pF | R8 = 47 Ω | | | |
| C9 = 5 pF | R9 = 47 Ω | | | |
| C10 = 5 pF | R10 = 13.7K Ω | | | |
| C11 = 1 μF | R11 = 950 Ω | | | |
| C12 = 1 μF | R12 = 47 Ω | | | |
| C13 = 1 μF | R13 = 10K Ω | | | |
| C14 = 1 μF | R14 = 7K Ω | | | |
| C15 = 1 μF | R15 = 3K Ω | | | |
| C16 = 1 μF | R16 = 2K Ω | | | |
| C17 = 1 μF | R17 = 1K Ω | | | |
| C18 = .01 μF | R18 = 1K Ω | | | |
| C19 = 100 pF | R19 = 1K Ω | | | |
| C20 = .001 μF | R20 = 1K Ω | | | |
| C21 = .01 μF | R21 = 4.02K Ω | | | |
| C22 = 1 μF | R22 = 59K Ω | | | |
| C23 = 1 μF | R23 = 4.32K Ω | | | |
| C24 = 10 μF | R24 = 60.4K Ω | | | |
| C25 = 10 μF | R25 = 1.82K Ω | | | |
| | R26 = 14K Ω | | | |
| | R27 = 1.87K Ω | | | |
| | R28 = 15K Ω | | | |

FIGURE 9A

| | |
|---|---|
| U1' = 74HC4040 | R1' = 4.7K Ω |
| U2' = 74HC4040 | R2' = 4.7K Ω |
| U5' = 74HC160 | |
| U6 = 74HC74 | |
| U7 = 74HC86 | |

FIGURE 9B

| | | | |
|---|---|---|---|
| C1' = .033 μF | R3' = 1K Ω | Q1' = 2N3904 | U3 = 2732 |
| C2' = .033 μF | R4' = 100 Ω | Q2 = 2N3904 | U4 = 74HC374 |
| | R5' = 1K Ω | Q3 = 2N3904 | U7 = 74HC86 |
| | R6' = 100 Ω | Q4 = 2N3906 | U8 = 2732 |
| | R7' 82 Ω | Q5 = 2N3904 | U9 = 74HC374 |
| | R8' = 82 Ω | Q6 = 2N3906 | |

FIGURE 10

| | | | |
|---|---|---|---|
| C1" = 0.001 μF | R1" 18K Ω | U1" = SP8755 | Q1" = 2N3904 |
| C2" = 0.001 μF | R2" = 10K Ω | U2" = MC145145 | |
| C3" = 0.001 μF | R3" = 10K Ω | U3A = TL072 | |
| C4" = 39 pF | R4" = 10K Ω | U3B = TL072 | |
| C5" = 39 pF | R5" = 10K Ω | U4A = TL072 | |
| C6" = 820 pF | R6" = 4.7K Ω | U4B = TL072 | |
| C7" = 820 pF | R7" = 4.7K Ω | U5" = LM10 | |
| C8" = .01 μF | R8" = 22K Ω | | |
| C9" = .01 μF | R9" = 1.5K Ω | | |
| C10" = 10 μF | R10" = 100K Ω | | |
| C11" = 820 pF | R11" = 3.3K Ω | | |
| C12" = .0033 μF | R12" = 3.3K Ω | | |
| C13" = 820 pF | R13" = 3.3K Ω | | |
| C14" = .0033 μF | R14" = 3.3K Ω | | |
| | R15" = 39K Ω | | |
| | R16" = 22K Ω | | |
| | R17" = 100 Ω | | |

What is claimed is:

1. A stepped frequency ground penetrating radar system comprising:
   a) RF signal generating means for generating an RF signal;
   b) transmitting means including means for forming in-phase and quadrature RF signals from said RF signal and transmitting said in-phase and quadrature RF signals to a target spaced from said transmitting means;
   c) receiving means for receiving reflected RF signals from said target and for mixing said reflected RF signals with a reference RF signal from said same RF signal generating means; and d) signal processing means for processing said signals to provide data indicating the depth and size of said target.

2. The stepped frequency ground penetrating radar system of claim 1 wherein said RF signal generating means further includes means for dividing said RF signal into a first signal sent to said transmitting means for transmission to said target and a second signal sent to said receiving means to provide said reference RF signal mixed with said RF signal received from said target.

3. The stepped frequency ground penetrating radar system of claim 2 wherein said means for forming an in-phase RF signal and a quadrature RF signal from said RF signal sent to said transmitting means from said RF signal generating means comprise a quadraphase modulator.

4. The stepped frequency ground penetrating radar system of claim 3 wherein said signal processing means further comprises means for processing said signals to provide frequency domain data representative of the depth and size of said target.

5. The stepped frequency ground penetrating radar system of claim 4 wherein said signals from said mixer in said receiving means are passed through a low pass filter having a cutoff frequency lower than said RF signal frequency and the DC component from said low pass filter is digitized and then converted into its frequency domain equivalent.

6. The stepped frequency ground penetrating radar system of claim 5 wherein said DC component data from said low pass filter is digitized and the digitized data is then converted into its frequency domain equivalent using a Fast Fourier Transform.

7. The stepped frequency ground penetrating radar system of claim 3 wherein said RF signals from said in-phase signal and a quadrature signal means in said transmitter means are transmitted to said target through an antenna means loaded with a lossless material having a dielectric constant of at least about 8 which permits formation of a narrow front lobe.

8. The stepped frequency ground penetrating radar system of claim 3 wherein said RF signals reflected from said target are received by antenna means substantially the same as the antenna means used to transmit said RF signals to said target.

9. The stepped frequency ground penetrating radar system of claim 3 wherein said antenna means further comprises a cylindrical cavity containing said lossless dielectric material and a grid covered with electromagnetic absorbing material capable of absorbing RF frequencies ranging from about 196 MHz to about 720 MHz and also capable of mitigating the formation of a back lobe in said antenna, with an electrode in said cavity separating said grid from said dielectric material.

10. The stepped frequency ground penetrating radar system of claim 3 wherein said RF signal generating means further comprises:
a) first and second RF signals;
b) means for dividing each of said first and second signals into first and second signal portions;
c) first mixer means for mixing the second signal portion of each of said first and second RF signals to provide said reference voltage to said receiving means;
d) means for connecting said first signal portion of said first RF signal with said means for forming said in-phase signal and quadrature RF signals; and
e) second mixer means for mixing the output of said first signal portion of said second RF signal with the output from said means for forming said in-phase signal and quadrature RF signals to form an RF signal to be transmitted to said target.

11. A stepped frequency ground penetrating radar system comprising:
a) RF signal generating means including:
  i) means for generating an RF signal; and
  ii) means for dividing said RF signal into first and second portions;
b) transmitting means for transmitting a first portion of said RF signal to a target spaced from said transmitting means comprising:
  i) means for forming an in-phase signal and a quadrature signal from said first portion of said RF signal; and
  ii) antenna means for transmitting said in-phase and quadrature RF signals to said target;
c) receiving means for receiving a reflected RF signal from said target comprising:
  i) antenna means for receiving reflected in-phase and quadrature RF signals from said target; and
  means for mixing said in-phase and said quadrature reflected RF signals with said second portion of said RF signal from said RF signal generating means comprising a single mixer; and
d) signal processing means for processing said signals to provide data indicating the depth and size of said target.

12. The stepped frequency ground penetrating radar system of claim 11 wherein said receiving means further comprise:
a) a low pass filter connected to the output of said single mixer and having a cutoff frequency lower than said RF signal frequency; and
b) a demodulator connected to the output of said low pass filter.

13. The stepped frequency ground penetrating radar system of claim 11 wherein said signal processing means further comprise:
a) means for forming digitized data from a DC component of said signal from said receiving means; and
b) means for processing said digitized data to provide frequency domain data representative of the depth and size of said target.

14. The stepped frequency ground penetrating radar system of claim 13 wherein said digitized data is processed into frequency domain data using a Fast Fourier Transform.

15. The stepped frequency ground penetrating radar system of claim 4 wherein said antenna means further comprise:
a) a cylindrical cavity having an inner conductive surface;
b) a cylindrical lossless dielectric material having a thickness of from about one third to about one half the depth of said cavity and having a diameter just slightly less than said cavity to permit said dielectric material to snugly fit into said cavity;
b) a cylindrical grid covered with electromagnetic absorbing material capable of absorbing RF frequencies ranging from about 196 MHz to about 720 MHz and also capable of mitigating the formation of a back lobe in said antenna, said cylindrical grid having a thickness of from about one third to about one half the depth of said cavity and having a diameter just slightly less than said cavity to permit said cylindrical grid to snugly fit into said cavity; and c) a cylindrical electrode in said cavity separating said grid from said dielectric material, said cylindrical electrode having a diameter just slightly less than said cavity to permit said cylindrical grid to snugly fit into said cavity.

16. A stepped frequency ground penetrating radar system comprising:
   a) RF signal generating means including:
      i) means for generating a first RF signal;
      ii) means for generating a second RF signal;
      ii) means for controlling said RF signals, comprising a phase locked loop; and
      iii) means for dividing each of said RF signals into a first RF signal portion to be transmitted and a second RF signal portion to act as a first reference RF signal; and
      iv) first mixer means for mixing together said second RF signal portion of each of first and second RF signals to form said first RF reference signal;
   b) transmitting means for transmitting a first portion of each of said first and second RF signals to a target spaced from said transmitting means comprising:
      first isolator means for providing spectral purity in said first portion of said first RF signal;
      means for forming an in-phase signal and a quadrature signal from said first portion of said first RF signal;
      iii) second isolator means for providing spectral purity in said first portion of said second RF signal comprising a second RF reference signal;
      iv) second mixer means for mixing said in-phase and said quadrature RF signals with said first portion of said second RF signal from said second isolator means comprising said second reference signal;
      v) amplifier means for amplifying said signal from said second mixer means; and
      vi) first antenna means for transmitting said amplified signal to said target;
   c) receiving means for receiving a reflected RF signal from said target comprising:
      i) second antenna means for receiving reflected signals, including said in-phase and quadrature RF signals, from said target;
      ii) third mixer means for mixing said reflected signal from said target with said first RF reference signal portion from said first mixer;
      iii) low pass filter means for filtering the output from said third mixer;
      iv) amplifier means for amplifying the output signal from said low pass filter means;
      v) means to demodulate the amplified output signal from said low pass filter means; and
   d) signal processing means for processing said signals to provide data indicating the depth and size of said target.

17. The stepped frequency ground penetrating radar system of claim 16 wherein said signal processing means further comprise:
   a) means for forming digitized data from a DC component of said signal from said receiving means; and
   b) means for processing said digitized data to provide frequency domain data representative of the depth and size of said target.

18. The stepped frequency ground penetrating radar system of claim 16 wherein one or more of said first and second antenna means further comprise:
   a) a cylindrical cavity having an inner conductive surface;
   b) a cylindrical dielectric material having a thickness of from about one fifth to about one fourth the depth of said cavity and having a diameter just slightly less than said cavity to permit said dielectric material to snugly fit into said cavity;
   b) a cylindrical grid covered with electromagnetic absorbing material capable of absorbing RF frequencies ranging from about 196 MHz to about 720 MHz and also capable of mitigating the formation of a back lobe in said antenna, said cylindrical grid having a thickness of from about two thirds to about three quarters of the depth of said cavity and having a diameter just slightly less than said cavity to permit said cylindrical grid to snugly fit into said cavity; and
   c) a cylindrical electrode in said cavity separating said grid from said dielectric material, said cylindrical electrode having a diameter just slightly less than said cavity to permit said cylindrical grid to snugly fit into said cavity.

* * * * *